Figure 1:
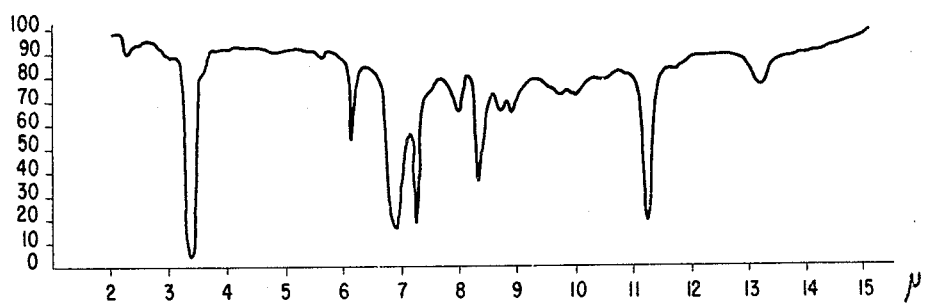

Sept. 1, 1964            C. LONGIAVE ETAL           3,147,237
2,3-DIMETHYL-BUTADIENE-1,3 POLYMERS AND COPOLYMERS
AND METHOD OF PREPARING SAME
Filed Aug. 2, 1960

INVENTORS
CARLO LONGIAVE
RENATO CASTELLI
MARIO FERRARIS

BY *Alexander J. McKillop*
ATTORNEY

United States Patent Office 3,147,237
Patented Sept. 1, 1964

3,147,237
2,3-DIMETHYL-BUTADIENE-1,3 POLYMERS AND COPOLYMERS AND METHOD OF PREPARING SAME
Carlo Longiave, Renato Castelli, and Mario Ferraris, all of Novara, Italy, assignors to Montecatini, Società Generale per l'Industria Mineraria e Chimica, Milan, Italy, a corporation of Italy
Filed Aug. 2, 1960, Ser. No. 47,096
Claims priority, application Italy Aug. 7, 1959
11 Claims. (Cl. 260—82.1)

The present invention relates to 2,3-dimethylbutadiene-1,3 polymers and to copolymers of 2,3-dimethylbutadiene-1,3 with other diolefins such as e.g. butadiene-1,3.

More particularly, this invention relates to a process for preparing such polymers and copolymers with the aid of catalysts of organometallic compounds and salts of metals of Group VIII of the Periodic Table.

Processes for the polymerization of certain diolefins, e.g. 1,3-butadiene have heretofore been described. Catalysts used in these processes comprise metal compounds wherein the metal is from Group VIII of the Periodic Table, and dialkyl aluminum monohalides. The Group VIII metal compound is either itself soluble in the solvent media used or else forms a complex that is soluble therein. This permits immediate formation, at the moment of reaction of the Group VIII metal compound with the dialkyl aluminum monohalide, of the entire quantity of catalyst, whereas with an insoluble Group VIII metal compound (or complex) a certain induction period is required.

It is an object of this invention to polymerize 2,3-dimethylbutadiene.

Another object is to copolymerize 2,3-dimethylbutadiene with another diolefin such as e.g. butadiene-1,3.

Additional objects will become apparent hereinafter.

We have found that with the use of the aforementioned catalysts it is possible to readily polymerize 2,3-dimethylbutadiene, and also to obtain copolymers of dimethylbutadiene with other diolefins and more particularly with butadiene-1,3.

For preparing such polymers and copolymers, the preferred catalysts are those consisting of a mixture of a compound represented by the formula $$MR_{n-1}X$$

where M is a metal belonging to the 2nd or 3rd group of the Periodic Table, R is an alkyl or aryl radical (such as ethyl, propyl, isobutyl, hexyl or phenyl), X is a halogen, and $n$ is equal to the valence of the metal M, along with a metal compound wherein the metal is from Group VIII of the Periodic Table.

Preferably cobalt compounds are used.

While Group VIII metal compounds which are insoluble in the reaction solvent can be used, a soluble Group VIII metal compound is preferred, because it permits easier control of the reaction rate and of the molecular weight of the product obtained.

We prefer to maintain a minimum of 5 millimoles of the organometallic compound and a minimum of 0.01 millimole of the Group VIII metal compound per each litre of solvent. In any event, an amount of an organometallic compound, sufficient to activate at least a portion of the Group VIII metal compound, must be present.

The polymerization is carried out in the presence of a solvent which is inert to the catalyst. Preferably a solvent that is an aromatic hydrocarbon is used. The polymerization can be carried out either in batch or continuously. The temperature of the polymerization may vary within rather wide limits, but is preferably between about 0° and 50° C.

Figure 2:
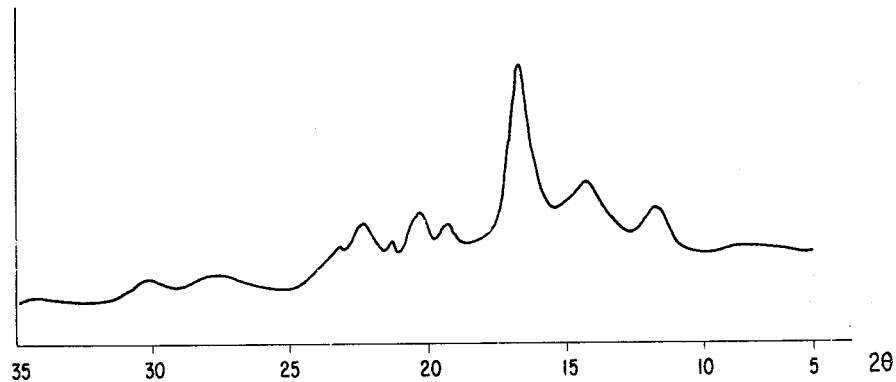

The accompanying drawings illustrate an infrared spectrum in FIG. 1 and an X-ray spectrum in FIG. 2.

The product obtained by polymerizing 2,3-dimethylbutadiene-1,3 in the presence of the aforementioned catalyst exhibits the infrared spectrum shown in FIGURE 1. At 11.24μ the absorption band characteristic of the vinylidenic group of 1,2-enchainment of dimethylbutadiene is observed. (The analysis was carried out on a layer of solid polymer.)

X-ray examination of the polymer resulted in the spectrum shown in FIGURE 2, from which a crystallinity of 70% can be calculated.

We have also found that under suitable conditions and with the aid of these catalysts, it is possible to obtain copolymers of dimethylbutadiene with other diolefins containing conjugated double bonds, particularly with butadiene-1,3. Butadiene which is copolymerized to copolymers under these conditions is substantially of the 1,4-cis structure. The determination of the structure of butadiene present in the chain is determined by infrared spectrography, carrying out the analysis on a layer of solid polymer and determining the optical densities by the baseline method, at 10.36μ for the trans-unsaturation, at 11.00μ for the vinylic unsaturation, and at 13.60μ for the cis unsaturation. The coefficients of apparent molecular extinction used are 10, 6, and 12, for the 1,4-trans, the 1,4-cis and 1,2 bonds, respectively. It has been noted that the percentage of 1,2-structure of butadiene increases by increasing the dimethylbutadiene content of the copolymer. The copolymers containing a large proportion of butadiene as opposed to dimethylbutadiene, e.g., having a content equal to or less than 10% dimethylbutadiene in the copolymer, are of considerable interest. Such copolymers nonetheless exhibit a considerable capacity for crystallization upon cooling, because they have a clear predominance of polybutadiene with 1,4-cis structure, as contrasted with the other polybutadiene and polymethylbutadiene structures. The copolymers containing higher percentages of dimethylbutadiene are also of interest in the field of elastomers.

The products obtained present good homogeneity and are completely soluble in hydrocarbons.

The copolymers obtained according to our invention are in fact true copolymers and are not a mere mixture of homopolymers. This is demonstrated by dilatometric examination carried out on products prepared with different proportions of dimethylbutadiene.

As will be noted from the following examples, the melting point of the copolymer decreases upon increasing the percentage of dimethylbutadiene present in the copolymer, while the induction time before crystallization increases.

The higher the dimethylbutadiene present in the copolymer, the lower is the polymerization rate, indicating that the product is a copolymer and not a mixture of homopolymers.

The various polymeric products obtained exhibit the properties and behavior of elastomers, and have consequent applicability in the rubber field. These polymeric products can be vulcanized in the conventional manner to produce rubbery products.

The following examples will illustrate our invention. All parts are by weight unless otherwise indicated.

EXAMPLE 1

100 ml. air-free anhydrous benzene, 0.65 g. (5 millimoles) anhydrous $CoCl_2$, 0.3 ml. pyridine, 0.012 mole diethyl aluminum monochloride, and 10 g. dimethylbutadiene are successively introduced under an inert gas medium into a 500-ml. glass flask provided with stirrer and thermometer. The mixture is agitated at room temperature for 24 hours. After this period the catalyst is destroyed with 20 ml. of methanol and the polymer is coagulated with 200 ml. of methanol, thereby obtaining a fibrous white product. This is washed with methanol several times and is vacuum dried in an oven at 40° C. 1.1 g. polymer are obtained.

EXAMPLE 2

230 ml. of air-free anhydrous benzene, 0.01 mole diethyl aluminum monochloride, 14.5 g. dimethylbutadiene and 0.023 millimole $CoCl_2$ (as a benzene solution of the cobalt chloride-pyridine complex) are successively introduced under an inert gas into a 500-ml. glass flask provided with stirrer and thermometer. The mixture is agitated at room temperature for 20 hours. After this period the catalyst is destroyed with 20 ml. of methanol and the polymer is coagulated with 500 ml. of methanol.

After further methanol washing treatments the product is vacuum dried in an oven at 40° C. 12 g. of a white polymer are obtained. This polymer under infrared analysis exhibits the spectrum shown in FIGURE 1, and by X-ray examination gave the diagram shown in FIGURE 2.

EXAMPLE 3

100 ml. air-free anhydrous benzene, 0.01 mole diethyl aluminum monochloride, 10 g. dimethyl butadiene, and 0.0308 g. $CoCl_2$ (as a benzene solution of the cobalt chloride-pyridine complex) are successively introduced under an inert gas into a 500-ml. glass flask provided with stirrer and thermometer. The mixture is agitated at room temperature for 15 hours. After this period the catalyst is destroyed with 20 ml. of methanol and the polymer is coagulated with 200 ml. of methanol.

The white fibrous mass obtained is washed with methanol several times and vacuum dried in an oven at 40° C. 10 g. polymer are obtained. The intrinsic viscosity, determined in toluene at 26° C. with a Desreux-Bischoff viscosimeter, is $[\eta]=0.43$. The gel number appears lower than 1. (The gel number is defined as the percentage of polymer undissolved after immersion of a given polymer amount (0.1–0.15 g.) in 100 ml. toluene for 40 hours in the dark without any agitation.)

EXAMPLE 4

100 ml. air-free anhydrous benzene, 0.01 mole diethyl aluminum monochloride, 10 g. dimethylbutadiene, and 0.023 millimole $CoCl_2$ (as a benzene solution of the cobalt chloride-pyridine complex), are successively introduced, under an inert gas, into a 500-ml. glass flask provided with stirrer and thermometer. The mixture is agitated at room temperature for 20 hours. After this period the catalyst is destroyed and the polymer is coagulated with methanol, washed several times with methanol, and vacuum dried in an oven at 40° C. 7 g. product are obtained. The intrinsic viscosity is $[\eta]=0.37$ and the gel number is 0.

EXAMPLE 5

1000 ml. of carefully deaerated anhydrous benzene, 4.32 g. (0.036 mole) diethyl aluminum monochloride, 84 g. butadiene-1,3, 14.5 g. dimethyl butadiene, and 13 mg. (0.1 millimole) $CoCl_2$ (as a benzene solution of the $CoCl_2$-pyridine complex) are successively introduced into a 3-litre stainless steel autoclave provided with stirrer and a cooling jacket. The mixture is agitated for 3 hours while the inner temperature is kept at 5° C. At the end the catalyst is destroyed by introducing 50 ml. methanol into the autoclave. From the autoclave, a viscous solution is withdrawn. This solution is treated with methanol to thereby precipitate the polymer. The polymer is further washed with methanol and finally vacuum dried in an oven at 40° C. The product thus obtained is examined by infrared spectrography. Moreover it is subjected to a determination of the intrinsic viscosity in toluene at 26° C. with a Desreux-Bischoff viscosimeter and to dilatometric examination. The results are tabulated in Table I.

EXAMPLES 6–9

Four runs are carried out in the same autoclave, differing from Example 5 only as regards the relative amounts of butadiene and dimethylbutadiene. The polymers obtained are subjected to the coagulation, purification and drying treatments described above and to the aforementioned examinations. The characteristics of the products obtained and their dilatometric behavior are reported in Table I. From this table it will be noted that the higher the quantity of dimethylbutadiene, the slower is the reaction. Increasing the dimethylbutadiene content of the polymer results in a decreased melting point, while a more and more difficult crystallization is noted. This behavior shows that the products obtained are copolymers of butadiene and dimethylbutadiene, and not mixtures of homopolymers.

*Table I*

[Diethyl aluminum monochloride 0.036 mole—$CoCl_2$ 0.1 millimole]
[Benzene 1000 ml.—temperature 15° C.]

| | Example No. | | | | |
|---|---|---|---|---|---|
| | 5 | 6 | 7 | 8 | 9 |
| Monomer Feed: | | | | | |
| Butadiene, g. | 84 | 38 | 86 | 91 | 106 |
| Dimethylbutadiene, g. | 14.5 | 10 | 10 | 5 | 0 |
| Time, hours | 3 | 3 | 2½ | 1½ | 1 |
| Polymer obtained, g. | 87.5 | 39.5 | 88.0 | 96 | 105 |
| Infrared Examination: | | | | | |
| Polybutadiene— | | | | | |
| 1,4 cis, percent | 72.6 | 77.5 | 88.0 | 89.9 | 94.1 |
| 1,4 trans, percent | 8.2 | 6.7 | 4.0 | 4.1 | 2.8 |
| 1,2, percent | 19.3 | 15.8 | 8.0 | 6.0 | 3.1 |
| Polydimethyl butadiene/100 g. polymer | 12.3 | 13.8 | 7.4 | 4.7 | |
| $[\eta]$ at 26° C. in toluene | 1.09 | 0.89 | 2.83 | 3.15 | 5.65 |
| Dilatometric Data: | | | | | |
| Crystallization characteristics— | | | | | |
| Isotherm of crystallization | −60 | −60 | −37 | −37 | −37 |
| Induction time | | | 6'–7' | approx. 3' | few seconds |
| Crystallization Time | Does not cryst. | Does not cryst. | 90'–100' | approx. 50' | 10'–20' |
| Melting Point, ° C. | | | −8.4 | −6.7 | −0.4 |

Variations can of course be made without departing from the spirit of our invention.

Having thus described our invention, what we desire to secure and claim by Letters Patent is:

1. A crystalline polymer of 2,3-dimethyl-butadiene-1,3 characterized by an anfrared spectrum at $11.24\mu$ showing an absorption band of the vinylidenic group, such absorption band is characteristic of 1,2-enchainment of dimethylbutadiene.

2. A copolymer of 2,3-dimethyl-butadiene with 1,3-butadiene characterized by an infrared spectrum at 11.24 microns showing an absorption band of the vinylidenic group which is characteristic of 1,2-enchainment of dimethylbutadiene, and in which the butadiene monomeric units therein contained have substantially a 1,4-cis-structure, said copolymer being obtained by the process of claim 5.

3. The copolymer of claim 2 wherein up to 10% dimethylbutadiene is contained in the copolymer, said copolymer being obtained by the process of claim 5.

4. A method for preparing a 2,3-dimethylbutadiene-1,3 polymer containing a 1,2-enchainment comprising dissolving 2,3-dimethylbutadiene-1,3 monomer in a hydrocarbon solvent and subjecting said monomer to polymerizing conditions in the presence of a catalyst at least partially soluble in the reaction medium, this catalyst consisting of a compound represented by the formula $AlR_2X$, wherein R is a radical selected from the group consisting of alkyl and aryl radicals, and X is a halogen, and along with a cobalt compound, the AlR$_2$X compound being present in a concentration of at least 5 millimoles per liter of solvent and said cobalt compound being present in a concentration of at least 0.01 millimole per liter of solvent.

5. A method for preparing a copolymer of 2,3-dimethylbutadiene-1,3 and butadiene monomers, wherein the butadiene monomer units contained therein have substantially a cis-1,4-structure, comprising dissolving said monomers in a hydrocarbon solvent and subjecting said monomers to polymerizing conditions in the presence of a catalyst at least partially soluble in the reaction medium, this catalyst consisting of a compound represented by the formula AlR$_2$X, wherein R is a radical selected from the group consisting of alkyl and aryl radicals and X is a halogen, along with a cobalt compound, the AlR$_2$X compound being present in a concentration of at least 5 millimoles per liter of solvent and said cobalt compound being present in a concentration of at least 0.05 millimole per liter of solvent.

6. The method of claim 4 wherein the cobalt compound is the CoCl$_2$-pyridine complex.

7. The method of claim 5 wherein the cobalt compound is the CoCl$_2$-pyridine complex.

8. The vulcanized polymer of claim 1.

9. The vulcanized copolymer of claim 2.

10. The method of claim 4, wherein said catalyst consists essentially of a cobalt chloride pyridine complex and diethyl aluminum chloride.

11. The method of claim 5, wherein said catalyst consists essentially of a cobalt chloride pyridine complex and diethyl aluminum chloride.

References Cited in the file of this patent

UNITED STATES PATENTS

| | | |
|---|---|---|
| 2,953,556 | Wolfe et al. | Sept. 20, 1960 |
| 3,016,371 | Natta et al. | Jan. 9, 1962 |

FOREIGN PATENTS

| | | |
|---|---|---|
| 543,292 | Belgium | June 2, 1956 |
| 1,196,658 | France | Nov. 25, 1959 |